(12) United States Patent
Naito

(10) Patent No.: US 12,355,125 B2
(45) Date of Patent: Jul. 8, 2025

(54) FUEL CELL SYSTEM

(71) Applicant: HONDA MOTOR CO., LTD., Tokyo (JP)

(72) Inventor: Hideharu Naito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 655 days.

(21) Appl. No.: 17/578,588

(22) Filed: Jan. 19, 2022

(65) Prior Publication Data

US 2022/0231318 A1    Jul. 21, 2022

(30) Foreign Application Priority Data

Jan. 21, 2021   (JP) .................. 2021-008044

(51) Int. Cl.
*H01M 8/24* (2016.01)
*H01M 8/2475* (2016.01)

(52) U.S. Cl.
CPC ...... *H01M 8/2475* (2013.01); *H01M 2250/20* (2013.01)

(58) Field of Classification Search
CPC .................................. H01M 8/2475
See application file for complete search history.

(56) References Cited

U.S. PATENT DOCUMENTS

| 2013/0183574 | A1* | 7/2013 | Asai | H01M 50/522 |
| | | | | 429/159 |
| 2016/0141644 | A1* | 5/2016 | Nagano | B60L 50/72 |
| | | | | 429/400 |
| 2017/0207477 | A1* | 7/2017 | Heinzmann | H01M 8/248 |
| 2018/0241050 | A1* | 8/2018 | Goto | H01M 8/0206 |
| 2020/0313220 | A1 | 10/2020 | Naito et al. | |
| 2021/0043961 | A1* | 2/2021 | Itou | H01M 8/04201 |

FOREIGN PATENT DOCUMENTS

| CN | 105609856 A | | 5/2016 |
| CN | 111755729 A | | 10/2020 |
| JP | 2006032329 A | * | 2/2006 |
| JP | 2019-175719 A | | 10/2019 |

OTHER PUBLICATIONS

Office Action/Search Report dated Jul. 31, 2024 issued in the corresponding Chinese Patent Application No. 202210070683.2 with the English machine translation thereof.

* cited by examiner

*Primary Examiner* — Nicholas A Smith
*Assistant Examiner* — Ziheng Lu
(74) *Attorney, Agent, or Firm* — Carrier, Shende & Associates P.C.; Joseph P. Carrier; Jeffrey T. Gedeon

(57) ABSTRACT

A first through-hole through which a first power lead-out member is inserted and a second through-hole through which a second power lead-out member is inserted are formed in an upper wall portion of a stack case of a fuel cell system. The length of the second through-hole in the stacking direction of the power generation cells is greater than the length of the first through-hole in the stacking direction.

10 Claims, 10 Drawing Sheets

FUEL CELL SYSTEM

CROSS-REFERENCE TO RELATED APPLICATIONS

This application is based upon and claims the benefit of priority from Japanese Patent Application No. 2021-008044 filed on Jan. 21, 2021, the contents of which are incorporated herein by reference.

BACKGROUND OF THE INVENTION

Field of the Invention

The present invention relates to a fuel cell system.

Description of the Related Art

The fuel cell system includes a stacked member and a stack case that houses the stacked member. The stacked member includes a cell stack body, a first terminal member, and a second terminal member. The cell stack body is formed by stacking a plurality of power generation cells one another. The first terminal member and the second terminal member are provided respectively at both ends of the cell stack body in the stacking direction of the plurality of power generation cells.

The first terminal member is electrically connected to an electrical unit provided at an upper portion of the stack case via the first power lead-out member. The second terminal member is electrically connected to the electrical unit via the second power lead-out member.

For example, as disclosed in JP 2019-175719 A, a first through-hole through which a first power lead-out member is inserted and a second through-hole through which a second power lead-out member is inserted are formed in an upper wall portion of a stack case. A distance between the second through-hole and the second terminal member is shorter than a distance between the first through-hole and the second terminal member.

SUMMARY OF THE INVENTION

The stacked member is formed by stacking the first terminal member, a plurality of power generation cells, and the second terminal member inside the stack case, for example. In this case, a compression load is applied to the stacked member from the second terminal member toward the first terminal member.

Then, the position of the second terminal member in the stacking direction with respect to the first terminal member varies depending on the assembly tolerance of the plurality of power generation cells and the dimensional tolerance of each power generation cell. That is, the second power lead-out member and the second through-hole tend to be out of alignment from each other in the stacking direction. Therefore, the second power lead-out member may fail to be inserted into the second through-hole. If the length of each of the first through-hole and the second through-hole in the stacking direction is set to be large in advance, there is a problem in that the rigidity of the upper wall portion decreases.

An object of the present invention is to solve the above-described problems.

In an aspect of the present invention, a fuel cell system includes a stacked member and a stack case accommodating the stacked member, the stacked member having a cell stack body, a first terminal member and a second terminal member, the cell stack body being formed of a plurality of power generation cells stacked one another, the first terminal member and the second terminal member being disposed respectively at both ends of the cell stack body, further including a first power lead-out member electrically connected to the first terminal member, a second power lead-out member electrically connected to the second terminal member, wherein the stack case includes an upper wall portion with a first through-hole for inserting the first power lead-out member and a second through-hole for inserting the second power lead-out member, and a length of the second through-hole is greater than a length of the first through-hole in a stacking direction of the plurality of power generation cells.

According to the present invention, since the length of the second through-hole in the stacking direction is greater than the length of the first through-hole in the stacking direction, misalignment between the second power lead-out member and the second through-hole in the stacking direction can be compensated for by making the second through-hole elongated in the stacking direction. Thus, even when the position of the second terminal member with respect to the first terminal member in the stacking direction varies, the second power lead-out member can be reliably inserted into the second through-hole. In addition, because the length of the first through-hole does not become greater than necessary in the stacking direction, it is possible to suppress a decrease in rigidity of the stack case.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Figure 1:
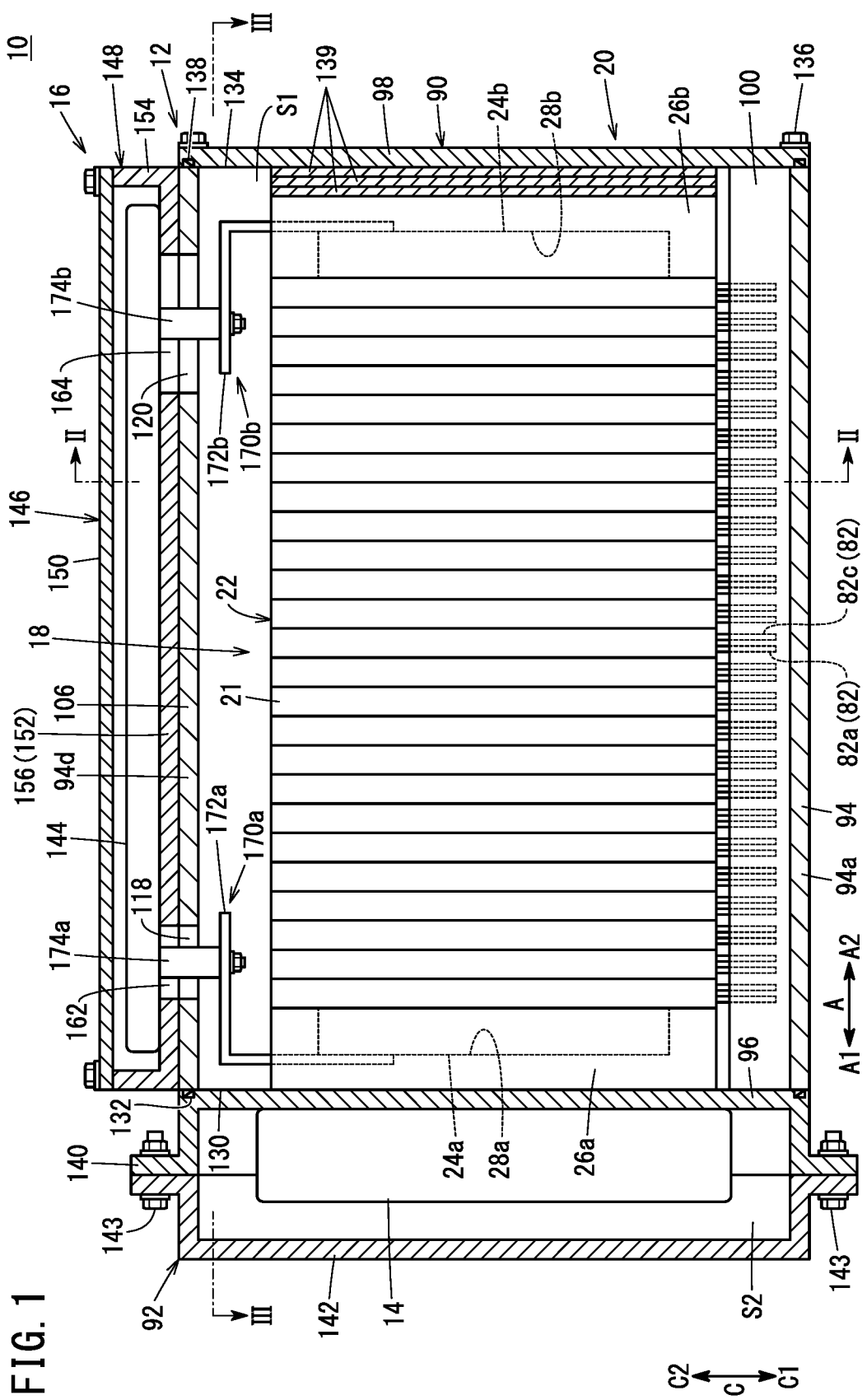
FIG. 1 is a longitudinal cross-sectional view of a fuel cell system according to an embodiment of the present invention.

A fuel cell system 10 shown in FIG. 1 is to be mounted on, for example, a fuel cell electric vehicle (fuel cell vehicle)

Figure 2:
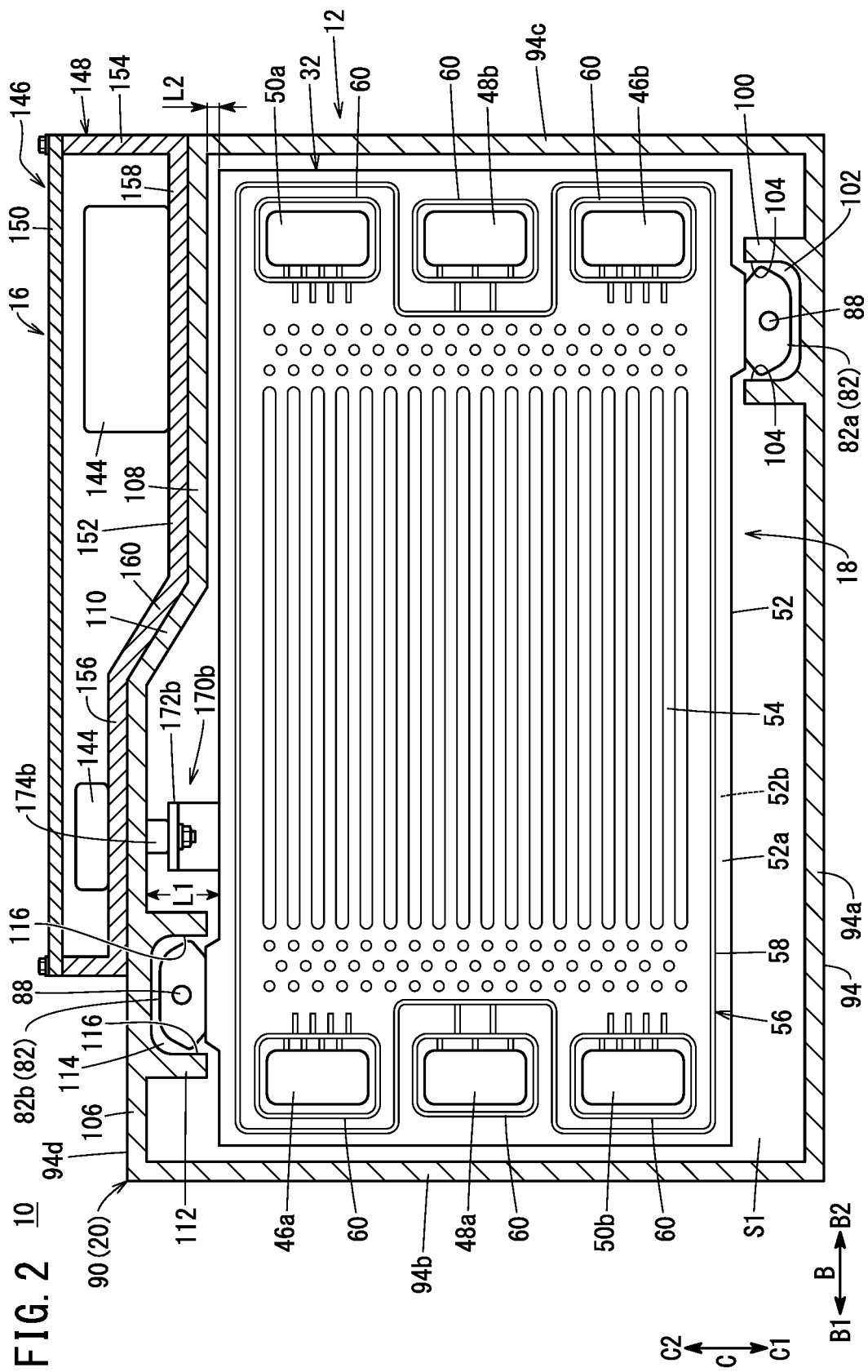
FIG. 2 is a lateral cross-sectional view taken along line II-II of FIG. 1.
Figure 3:
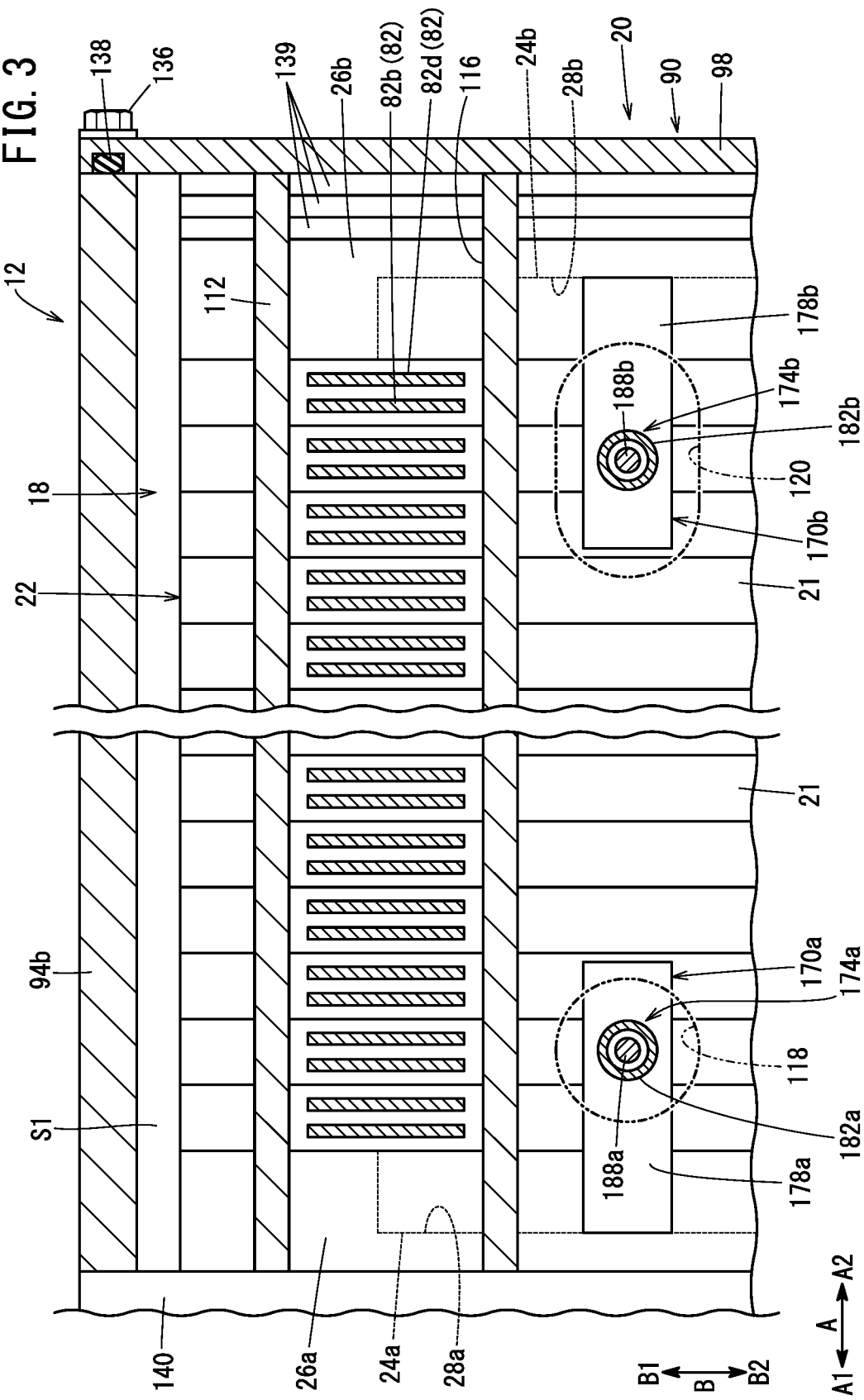
FIG. 3 is a partially omitted cross-sectional view taken along line III-III of FIG. 1.

(not shown). In FIGS. 1 to 3, the fuel cell system 10 includes a fuel cell stack 12, a fuel cell auxiliary device 14, and an electrical unit 16.

The fuel cell stack 12 includes a stacked member 18 and a case unit 20 that houses the stacked member 18. The stacked member 18 includes a cell stack body 22 in which a plurality of power generation cells 21 are stacked. The fuel cell stack 12 is disposed such that the stacking direction (direction of the arrow A) of the plurality of power generation cells 21 extends horizontally. In the following description, the stacking direction of the plurality of power generation cells 21 may be simply referred to as a "stacking direction".

In FIG. 1, a first terminal member 24a and a first insulating plate 26a are disposed outward (in the direction of the arrow A1) in this order at one end (an end in the direction of the arrow A1) in the stacking direction of the cell stack body 22. A second terminal member 24b and a second insulating plate 26b are disposed outward (in the direction of the arrow A2) in this order at the other end of the cell stack body 22 (an end in the direction of the arrow A2) in the stacking direction. The stacked member 18 includes the cell stack body 22, the first terminal member 24a, the first insulating plate 26a, the second terminal member 24b, and the second insulating plate 26b.

Each of the first terminal member 24a and the second terminal member 24b collects electric power generated by each power generation cell 21. Each of the first terminal member 24a and the second terminal member 24b is formed in a plate shape (quadrangular plate shape). Each of the first terminal member 24a and the second terminal member 24b is made of a conductive metal material such as pure copper, a copper alloy, pure aluminum, or an aluminum alloy.

The first terminal member 24a is disposed in a first recess 28a formed in an inner surface (surface on the arrow A2 side) of the first insulating plate 26a. The first terminal member 24a is in electrical contact with the power generation cell 21 located at one end in the stacking direction (an end on the arrow A1 side). The thickness of the first terminal member 24a in the stacking direction is greater than the thickness of the power generation cell 21.

The second terminal member 24b is disposed in a second recess 28b formed in the inner surface (on the arrow A1 side) of the second insulating plate 26b. The second terminal member 24b is in electrical contact with the power generation cell 21 located at the other end in the stacking direction (on the arrow A2 side). The thickness of the second terminal member 24b in the stacking direction is greater than the thickness of the power generation cell 21. The shape and size of the first terminal member 24a and the second terminal member 24b can be set as appropriate.

Each of the first insulating plate 26a and the second insulating plate 26b is formed of, for example, an electrically insulating resin material into a quadrangular shape.

Figure 4:
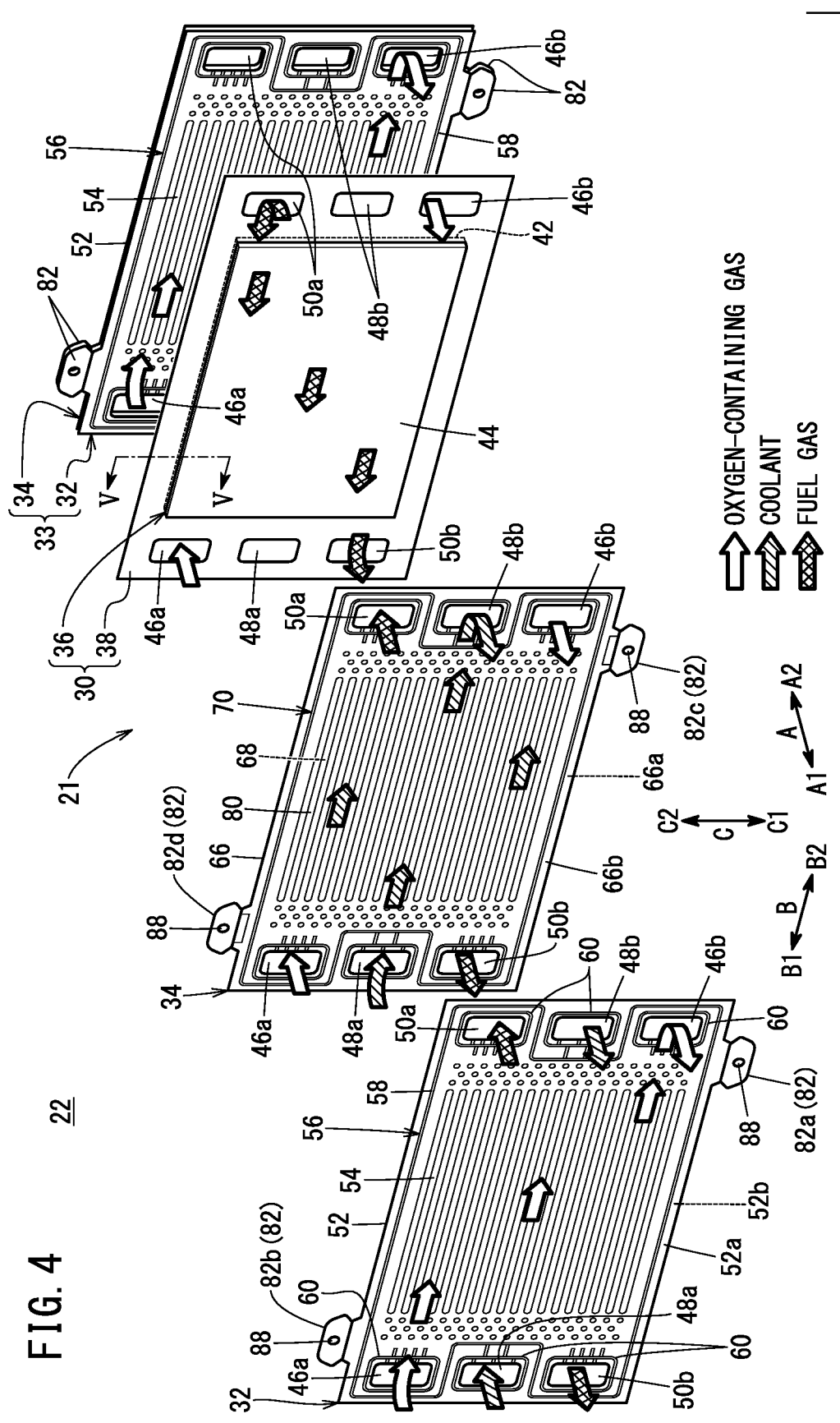
FIG. 4 is an exploded perspective view of the cell stack of FIG. 1.

As shown in FIG. 4, the power generation cell 21 has a horizontally long rectangular shape. The power generation cell 21 includes a resin-framed membrane electrode assembly (hereinafter referred to as a "resin-framed MEA 30"), a first separator 32, and a second separator 34. The resin-framed MEA 30 is disposed between the first separator 32 and the second separator 34.

Each of the first separator 32 and the second separator 34 is formed by press-forming a thin metal plate into a corrugated cross-sectional shape. The thin metal plate is, for example, a steel plate, a stainless steel plate, an aluminum plate, or a plated steel plate. The thin metal plate may be a stainless steel plate whose surface has been subjected to anti-corrosive surface treatment or an aluminum plate whose surface has been subjected to anti-corrosive surface treatment. The first separator 32 and the second separator 34 are joined to each other by a plurality of joining lines (not shown) to form a joined separator 33.

The resin-framed MEA 30 includes a membrane electrode assembly (hereinafter referred to as "MEA 36") and a resin-frame member 38 (resin-frame portion, resin film) that is joined to and surrounds an outer peripheral portion of the MEA 36.

Figure 5:
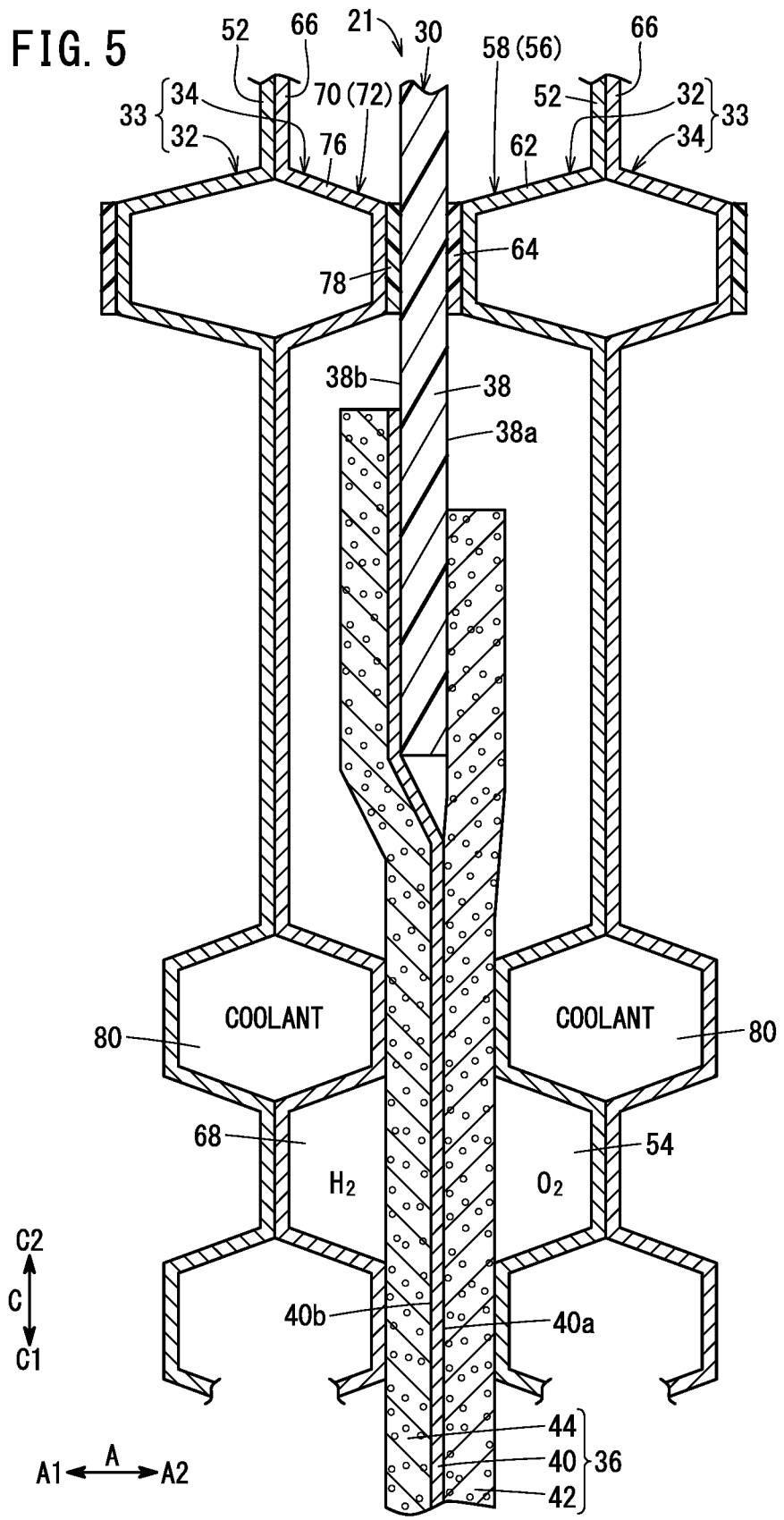
FIG. 5 is a cross-sectional view taken along line V-V of FIG. 4.

In FIG. 5, the MEA 36 includes an electrolyte membrane 40, a cathode 42 provided on one surface 40a of the electrolyte membrane 40, and an anode 44 provided on the other surface 40b of the electrolyte membrane 40. The electrolyte membrane 40 is, for example, a solid polymer electrolyte membrane (cation exchange membrane). For example, the sold polymer electrolyte membrane is a thin membrane of perfluorosulfonic acid containing water. The electrolyte membrane 40 is sandwiched between the cathode 42 and the anode 44. The electrolyte membrane 40 may be a fluorine-based electrolyte membrane or a hydrocarbon (HC)-based electrolyte membrane.

As shown in FIG. 4, an oxygen-containing gas supply passage 46a, a coolant supply passage 48a, and a fuel gas discharge passage 50b are provided in each of the power generation cells 21 at one end of a longer side. The one end in the longer side of the power generation cell 21 is an end portion of the power generation cell 21 in the arrow B1 direction. The oxygen-containing gas supply passage 46a, the coolant supply passage 48a, and the fuel gas discharge passage 50b are arranged along the shorter side of the power generation cell 21. The shorter side of the power generation cell 21 extends in the arrow C direction.

An oxygen-containing gas which is one of the reaction gases flows through the oxygen-containing gas supply passage 46a in the direction indicated by the arrow A2. A coolant (for example, pure water, ethylene glycol, oil, or the like) flows through the coolant supply passage 48a in the direction of the arrow A2. A fuel gas (e.g., a hydrogen-containing gas) which is the other of the reaction gases flows through the fuel gas discharge passage 50b in the direction indicated by the arrow A1.

A fuel gas supply passage 50a, a coolant discharge passage 48b, and an oxygen-containing gas discharge passage 46b are provided in each of the power generation cells 21 at the other end of in the longer side (the end portion in the arrow B2 direction). The fuel gas supply passage 50a, the coolant discharge passage 48b, and the oxygen-containing gas discharge passage 46b are arranged in the direction indicated by the arrow C.

The fuel gas flows through the fuel gas supply passage 50a in the direction indicated by the arrow A2. The coolant flows through the coolant discharge passage 48b in the direction indicated by the arrow A1. The oxygen-containing gas flows through the oxygen-containing gas discharge passage 46b in the direction indicated by the arrow A1.

The arrangement, shape, and size of the above-described passages (such as the oxygen-containing gas supply passage 46a) are not limited to those in the present embodiment, and may be appropriately set according to required specifications.

As shown in FIGS. 2 and 4, the first separator 32 includes a first separator main body 52 having a metal plate shape. The first separator main body 52 has a surface facing the resin-framed MEA 30 (hereinafter referred to as a "front surface 52a". The front surface 52a includes an oxygen-containing gas flow field 54 (reactant gas flow field) extending in the longer side (direction of the arrow B) of the power generation cell 21. The oxygen-containing gas flow field 54 fluidly communicates with the oxygen-containing gas supply passage 46a and the oxygen-containing gas discharge passage 46b. The oxygen-containing gas serving as the reactant gas is supplied to the cathode 42 from the oxygen-containing gas flow field 54.

A first seal portion 56 for preventing leakage of a fluid, which is the reaction gas (oxygen-containing gas or fuel gas) or the coolant is provided on the front surface 52a of the first separator main body 52. The first seal portion 56 is pressed against one surface 38a of the resin frame member 38 (see FIG. 5). The first seal portion 56 extends linearly when viewed from the separator thickness direction (the arrow A direction). However, the first seal portion 56 may extend in a wavy shape when viewed from the separator thickness direction.

The first seal portion 56 includes a plurality of first passage seal portions 60 that individually surround the plurality of passages (such as the oxygen-containing gas supply passage 46a), and a first flow field seal portion 58 provided on the outer periphery of the first separator main body 52.

As shown in FIG. 5, the first seal portion 56 includes a first seal bead portion 62 protruding toward the resin-framed MEA 30 and a first resin material 64 provided on the first seal bead portion 62. The first seal bead portion 62 is formed integrally with the first separator main body 52 by press forming. The first seal bead portion 62 is elastically deformed by a compressive load in the direction of the arrow A.

Figure 6:
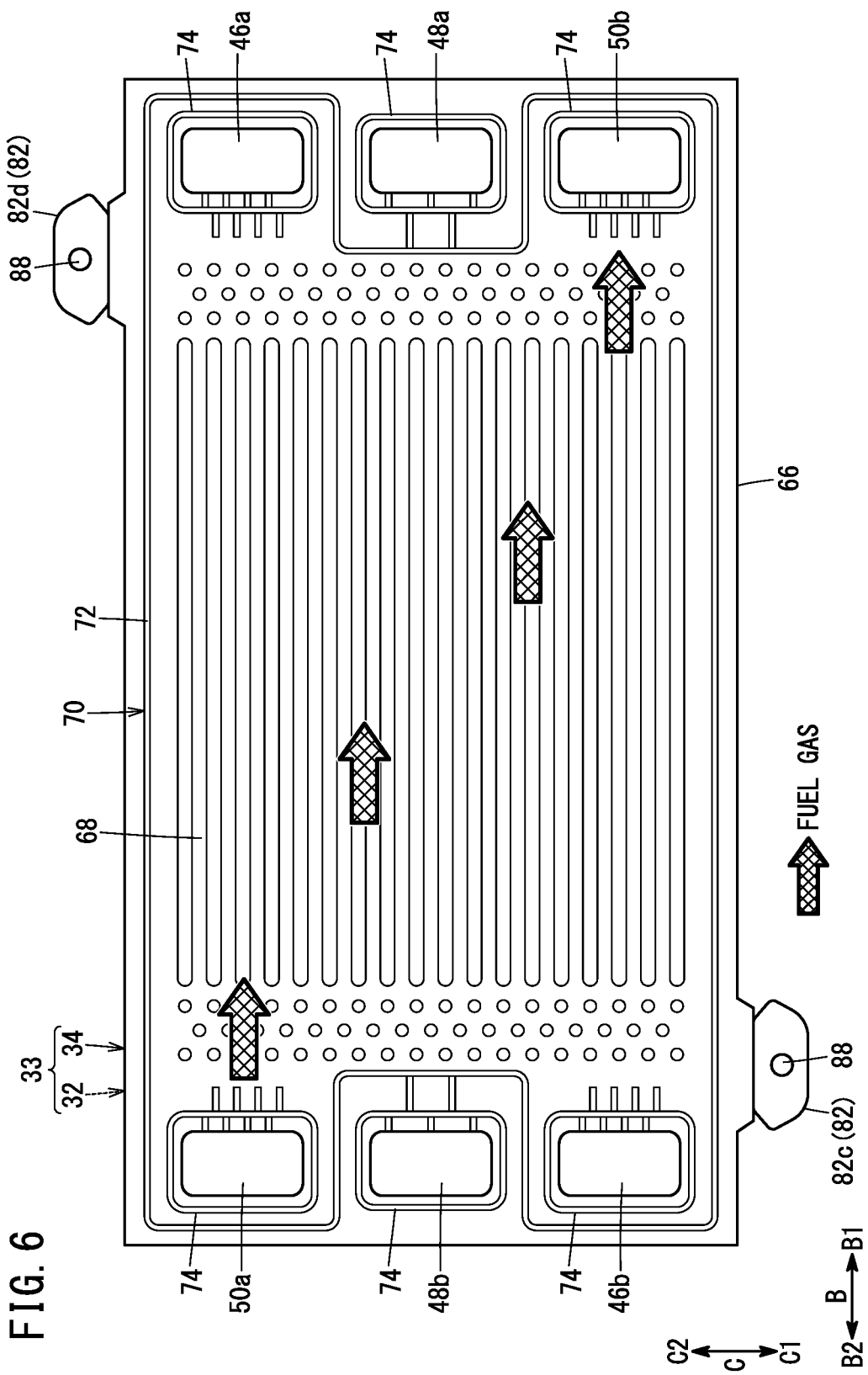
FIG. 6 is a plan view of the joined separator shown in FIG. 4 as viewed from the second separator side.

As shown in FIGS. 4 and 6, the second separator 34 includes a second separator main body 66 having a metal plate shape. The second separator main body 66 has a surface facing the resin-framed MEA 30 (hereinafter referred to as a "front surface 66a". The front surface 66a includes a fuel gas flow field 68 (reactant gas flow field) extending in the longer side (direction of arrow B) of the power generation cell 21. The fuel gas flow field 68 fluidly communicates with the fuel gas supply passage 50a and the fuel gas discharge passage 50b. The fuel gas serving as the reactant gas is supplied to the anode 44 from the fuel gas flow field 68.

A second seal portion 70 for preventing leakage of the fluid, which is the reactant gas (oxygen-containing gas or fuel gas) or the coolant is provided on the front surface 66a of the second separator main body 66. The second seal portion 70 is pressed against the other surface 38b of the resin frame member 38 (see FIG. 5). The second seal portion 70 extends linearly when viewed in the separator thickness direction (the direction of the arrow A). However, the second seal portion 70 may extend in a wavy shape when viewed from the separator thickness direction.

The second seal portion 70 is disposed so as to overlap the first seal portion 56 when viewed from the stacking direction (the arrow A direction) of the plurality of power generation cells 21. The second seal portion 70 includes a plurality of second passage seal portions 74 that individually surround the plurality of passages (e.g., the oxygen-containing gas supply passage 46a), and a second flow field seal portion 72 provided on the outer peripheral portion of the second separator main body 66.

As shown in FIG. 5, the second seal portion 70 includes a second seal bead portion 76 protruding toward the resin-framed MEA 30 and a second resin material 78 provided on the second seal bead portion 76. The second seal bead portion 76 is formed integrally with the second separator main body 66 by press forming. The second seal bead portion 76 is elastically deformed by a compressive load in the direction of arrow A.

In FIG. 4, a coolant flow field 80 that fluidly communicates with the coolant supply passage 48a and the coolant discharge passage 48b is formed between the back surface 52b of the first separator main body 52 and the back surface 66b of the second separator main body 66 that are joined to each other. The coolant flow field 80 is formed by the back surface shape of the first separator main body 52 and the back surface shape of the second separator main body 66 that are stacked together.

As shown in FIGS. 2 to 4 and 6, each power generation cell 21 is provided with four load receiving portions 82 (a first load receiving portion 82a, a second load receiving portion 82b, a third load receiving portion 82c, and a fourth load receiving portion 82d). When an external load in the direction of the arrow B acts on the fuel cell stack 12, the four load receiving portions 82 receive the external load.

Each load receiving portion 82 is joined to an outer edge portion of the power generation cell 21 so as to protrude outward from the power generation cell 21. A positioning hole 88 is formed in each load receiving portion 82. A rod (not shown) is inserted into the positioning holes 88 for positioning the power generation cells 21 in the plane direction at the time of producing the fuel cell stack 12 (at the time of stacking the power generation cells 21).

In FIGS. 2 and 4, the first load receiving portion 82a is provided on the first separator main body 52 so as to protrude downward (in the direction of the arrow C1) from the lower end portion of the first separator main body 52. The first load receiving portion 82a is located so as to be shifted from the center of the longer side of the first separator main body 52 in the arrow B2 direction (in the width direction, in the direction indicated by the arrow B).

The second load receiving portion 82b is provided on the first separator main body 52 so as to protrude upward (in the direction of the arrow C2) from the upper end portion of the first separator main body 52. The second load receiving portion 82b is positioned so as to be shifted from the center of the longer side of the first separator main body 52 in the arrow B1 direction.

In FIGS. 4 and 6, the third load receiving portion 82c is provided on the second separator main body 66 so as to protrude downward from the lower end portion of the second separator main body 66. The third load receiving portion 82c is located so as to be shifted from the center of the longer side of the second separator main body 66 in the arrow B2 direction (in the width direction, in the direction indicated by the arrow B). The third load receiving portion 82c faces the first load receiving portion 82a.

The fourth load receiving portion 82d is provided on the second separator main body 66 so as to protrude upward from the upper end portion of the second separator main body 66. The fourth load receiving portion 82d is located at a position shifted from the center of the longer side of the second separator main body 66 in the arrow B1 direction. The fourth load receiving portion 82d faces the second load receiving portion 82b.

As shown in FIG. 1, the case unit 20 has a quadrangular shape when viewed from a direction orthogonal to the arrow A direction, and the longer side thereof extends along the arrow A direction. The case unit 20 includes a stack case 90 forming a stack housing space S1 for housing the stacked member 18, and an auxiliary device case 92 forming an auxiliary machine housing space S2 for housing the fuel-cell auxiliary device 14. The stack case 90 and the auxiliary device case 92 are adjacent to each other in the direction of the arrow A. In other words, the auxiliary device case 92 is positioned on the arrow A1 side of the stack case 90.

The stack case 90 includes a quadrangular cylindrical peripheral wall case 94 that covers the outer peripheral surface of the stacked member 18, a first end plate 96 disposed at one end (an end on the arrow A1 side) of the peripheral wall case 94, and a second end plate 98 disposed at the other end (an end on the arrow A2 side) of the peripheral wall case 94. That is, the stack housing space S1 is defined by the peripheral wall case 94, the first end plate 96, and the second end plate portion 98.

In FIGS. 1 to 3, the peripheral wall case 94 includes a lower wall portion 94a, a pair of side wall portions 94b, 94c protruding upward from the lower wall portion 94a, and an upper wall portion 94d connecting protruding ends of the pair of side wall portions 94b, 94c to each other. In FIG. 2, a first support portion 100 protruding upward is provided on an inner surface of the lower wall portion 94a. The first support portion 100 extends in the direction of arrow A over the entire length of the peripheral wall case 94. A first groove portion 102 that accommodates the first load receiving portion 82a and the third load receiving portion 82c is formed in the protruding end of the first support portion 100. The first groove portion 102 extends along the arrow A direction.

The first support portion 100 is provided with two first support surfaces 104. The two first support surfaces 104 are positioned so as to sandwich the first load receiving portion 82a and the third load receiving portion 82c in the direction of the arrow B. When an external load in the arrow B direction acts on the fuel cell stack 12, the first load receiving portion 82a and the third load receiving portion 82c come into contact with one of the two first support surfaces 104, thereby suppressing positional deviation of the plurality of power generation cells 21 in the arrow B direction.

As shown in FIG. 2, the upper wall portion 94d includes a first portion 106, a second portion 108, and a connecting portion 110. The first portion 106 covers the second load receiving portion 82b and the fourth load receiving portion 82d from above. The second portion 108 is located below (in the direction of the arrow C1) the outer surface (upper surface) of the first portion 106. The connecting portion 110 connects the first portion 106 and the second portion 108 to each other.

The second portion 108 is positioned in the arrow B2 direction with respect to the first portion 106. Each of the first portion 106, the second portion 108, and the connecting portion 110 extends over the entire length of the peripheral wall portion 154 in the arrow A direction (see FIG. 7). The connecting portion 110 extends so as to be inclined downward from the first portion 106 toward the second portion 108. The connecting portion 110 is located above the center of the power generation cell 21 in the arrow B direction. The interval L1 between the inner surface of the first portion 106 and the outer surface of the cell stack body 22 (the upper end of the joined separator 33) is wider than the interval L2 between the inner surface of the second portion 108 and the outer surface of the cell stack body 22 (the upper end of the joined separator 33).

In FIGS. 2 and 3, a second support portion 112 protruding downward is provided on an inner surface of the first portion 106. The second support portion 112 extends in the direction of the arrow A over the entire length of the peripheral wall case 94. A second groove portion 114 that accommodates the second load receiving portion 82b and the fourth load receiving portion 82d is formed in the protruding end of the second support portion 112. The second groove portion 114 extends along the arrow A direction.

The second support portion 112 is provided with two second support surfaces 116. The two second support surfaces 116 are positioned so as to sandwich the second load receiving portion 82b and the fourth load receiving portion 82d in the direction of the arrow B. When an external load in the arrow B direction acts on the fuel cell stack 12, the second load receiving portion 82b and the fourth load receiving portion 82d come into contact with one of the two second support surfaces 116, thereby suppressing positional deviation of the plurality of power generation cells 21 in the arrow B direction.

Figure 7:
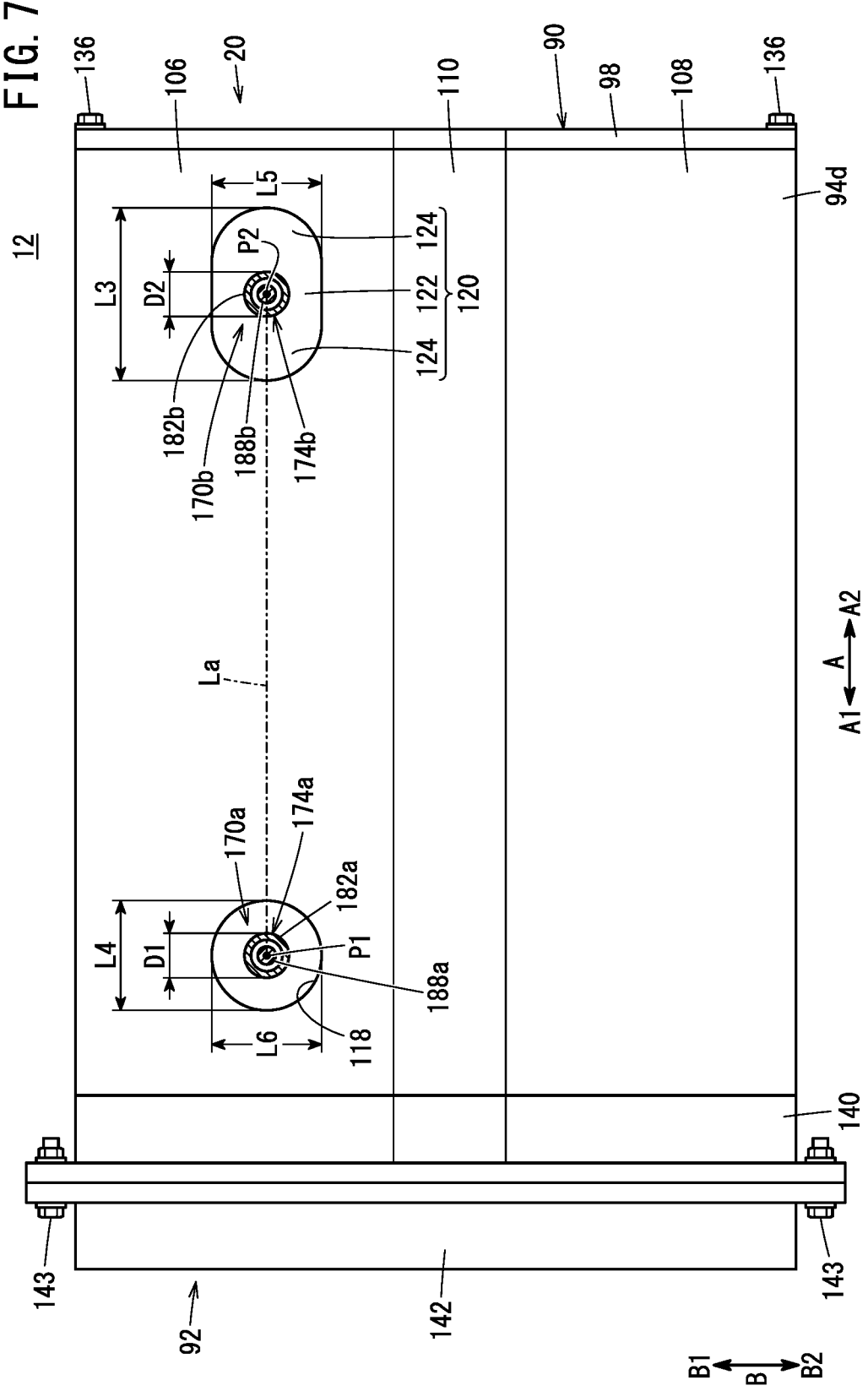
FIG. 7 is an explanatory plan view of the case member shown in FIG. 1 as seen from above.

As shown in FIGS. 1 and 7, a first through-hole 118 and a second through-hole 120 are formed in the first portion 106. The upper wall portion 94d includes a first end located at one end (on the arrow A1 side) in the stacking direction of the power generation cells 21 and a second end located at the other end (on the arrow A2 side) in the stacking direction of the power generation cells 21. The first through-hole 118 is located between the center and the first end of the upper wall portion 94d in the stacking direction of the power generation cells 21. In other words, the first through-hole 118 is positioned closer to the first terminal member 24a side (the auxiliary device case 92 side, on the arrow A1 side) than the center of the stacked member 18 in the longitudinal direction (the arrow A direction). The second through-hole 120 is located between the center and the second end of the upper wall portion 94d in the stacking direction of the power generation cells 21. In other words, the second through-hole 120 is located closer to the second terminal member 24b (on the arrow A2 side) than the center of the stacked member 18 in the longitudinal direction. That is, the second through-hole 120 is located closer to the second terminal member 24b than the first through-hole 118.

In FIG. 7, the first through-hole 118 and the second through-hole 120 are positioned so as to be shifted on the arrow B1 side from the center of the power generation cell 21 in the direction of the arrow B. The first through-hole 118 is formed in a perfect circular shape. The second through-hole 120 is an elongated hole elongated in the stacking direction (direction of the arrow A). Specifically, the second through-hole 120 is defined by the combination of a quadrangular central hollow portion 122 extending in the stacking direction, and two end hollow portions 124 provided at both ends of the central hollow portion 122 and connected to the central hollow portion 122 in the arrow A direction. Each of the end hollow portions 124 is formed in a substantially semicircular shape. That is, both ends of the second through-hole 120 in the stacking direction (the arrow A direction) are curved or arc-shaped.

The length L3 of the second through-hole 120 in the stacking direction is greater than the length L4 of the first through-hole 118 (the diameter of the first through-hole 118) in the stacking direction. A length L5 of the second through-hole 120 (the central hollow portion 122) in the direction of the arrow B is the same as a length L6 of the first through-hole 118 (a diameter of the first through-hole 118) in the direction of the arrow B. The center P1 of the first through-hole 118 and the center P2 of the second through-hole 120 are located on a single straight line La extending along the direction of the arrow A.

The shapes of the first through-hole 118 and the second through-hole 120 can be appropriately set. The first through-hole 118 is not limited to a perfect circular shape, and may be an elongated hole elongated along the direction of the arrow A (a shape similar to the second through-hole 120). Even in this case, the length L3 of the second through-hole 120 in the stacking direction is greater than the length L4 of the first through-hole 118 in the stacking direction. Each of the first through-hole 118 and the second through-hole 120 may have an elliptical shape longer in the stacking direction. The length L6 of the first through-hole 118 in the direction of the arrow B may be different from a length L5 of the second through-hole 120 in the direction of the arrow B. The center P1 of the first through-hole 118 and the center P2 of the second through-hole 120 may not be located on the single straight line La extending along the direction of the arrow A.

As shown in FIG. 1, the first end plate 96 is joined to the peripheral wall case 94 by bolts (not shown) so as to close a first opening portion 130 formed at one end of the peripheral wall case 94. An annular seal member 132 made of an elastic material is interposed between the first end plate 96 and the peripheral wall case 94 along the outer periphery of the first opening portion 130.

The second end plate 98 is joined to the peripheral wall case 94 by bolts 136 so as to close a second opening portion 134 formed at the other end of the peripheral wall case 94. An annular seal member 138 made of an elastic material is interposed between the second end plate 98 and the peripheral wall case 94 along the outer periphery of the second opening portion 134. When the second end plate 98 is fastened to the peripheral wall case 94 by the bolts 136, a compressive load is applied to the cell stack body 22. A plate-shaped shim 139 is provided between the second end plate 98 and the second insulating plate 26b. The compressive load is adjusted by the thickness (number of sheets) of the shim 139, and the position of the second terminal member 24b is displaced in the stacking direction.

The auxiliary device case 92 is a protective case for protecting the fuel-cell auxiliary device 14 housed in the auxiliary device housing space S2. Examples of the fuel cell auxiliary device 14 include a gas-liquid separator, an injector, an ejector, a fuel gas pump, and valves, which are not illustrated. The auxiliary device case 92 is formed by joining a box-shaped first case member 140 and a box-shaped second case member 142 to each other by bolt members 143. The first case member 140 opens in the direction of the arrow A1. The second case member opens in a direction of the arrow A2.

The first end plate 96 serves as both a wall portion of the stack case 90 and a wall portion of the auxiliary device case 92. In other words, the first end plate 96 is a partition wall between the stack housing space S1 and the auxiliary device housing space S2.

In FIGS. 1 and 2, the electrical unit 16 is provided on an outer surface of an upper wall portion 94d of the stack case 90. The electrical unit 16 includes electrical unit bodies 144 and an electrical component case 146 that houses the electrical unit bodies 144. The electrical unit bodies 144 include a contactor (switch), a control unit, and the like. The control unit controls the voltage of the electric power generated by the fuel cell stack 12. The electrical unit bodies 144 include a first terminal portion 145a in which a first hole 143a is formed and a second terminal portion 145b in which a second hole 143b is formed (see FIG. 8).

The electrical component case 146 includes a case main body 148 whose upper side is open, and a cover 150 that closes the upper opening of the case main body 148. The case main body 148 includes a bottom wall portion 152 and a peripheral wall portion 154 extending upward from an outer peripheral portion of the bottom wall portion 152. The bottom wall portion 152 includes a first bottom wall portion 156 provided on an outer surface (upper surface) of the first portion 106 of the stack case 90, a second bottom wall portion 158 provided on an outer surface (upper surface) of the second portion 108 of the stack case 90, and a wall portion 160 connecting the first bottom wall portion 156 and the second bottom wall portion 158 to each other.

Figure 8:
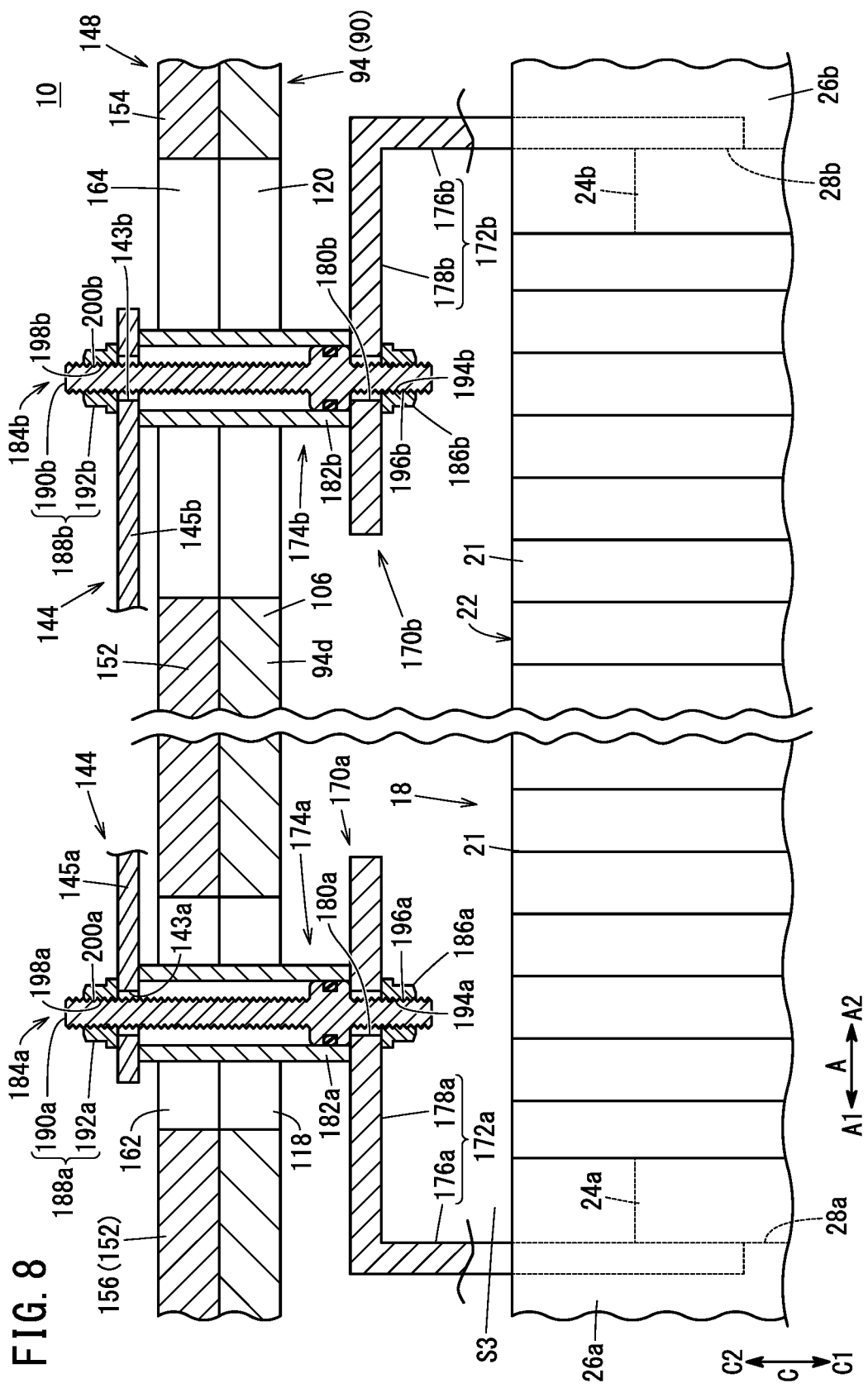
FIG. 8 is an enlarged cross-sectional view illustrating the first power lead-out member and the second power lead-out member shown in FIG. 1.

As shown in FIGS. 1 and 8, a first communication hole 162 communicating with the first through-hole 118 and a second communication hole 164 communicating with the second through-hole 120 are formed in the first bottom wall portion 156. The first communication hole 162 is formed in the same size and shape as the first through-hole 118. The center of the first communication hole 162 is located at a position overlapping the center P1 of the first through-hole 118 or a position close to the center P1 when viewed from above. The second communication hole 164 is formed in the same size and shape as the second through-hole 120. The center of the second communication hole 164 is located at a position overlapping the center P2 of the second through-hole 120 or a position close to the center P2 when viewed from above.

The first communication hole 162 may be formed larger than the first through-hole 118. Further, the second communication hole 164 may be formed larger than the second through-hole 120.

As shown in FIG. 8, the fuel cell stack 12 includes a first power lead-out member 170a and a second power lead-out member 170b for leading out the power generated by each of the power generation cells 21 to the electrical unit 16.

The first power lead-out member 170a electrically connects the first terminal member 24a and the first terminal portion 145a of the electrical unit body 144 to each other. The first power lead-out member 170a includes a first conductor portion 172a and a first connection portion 174a.

The first conductor portion 172a is a bus bar formed in a band shape. The first conductor portion 172a is made of, for example, copper, aluminum, stainless steel, titanium, or a metal containing any of these as a main component. The first conductor portion 172a is an L-shaped integrally molded product. The first conductor portion 172a includes a first fixing portion 176a extending in the vertical direction (the direction of the arrow C) and a first extending portion 178a extending in the stacking direction (the direction of the arrow A).

One end portion (lower end portion) of the first fixing portion 176a is electrically connected to the first terminal member 24a by brazing, swaging, welding, screwing, or the like. The other end (upper end) of the first fixing portion 176a is located above the first insulating plate 26a (cell stack body 22).

The first extending portion 178a extends from the other end portion of the first fixing portion 176a in the arrow A2 direction. The first extending portion 178a is located in the space S3 between the first portion 106 of the upper wall portion 94d and the cell stack body 22. In other words, the first extending portion 178a is spaced apart from both the cell stack body 22 and the first portion 106.

In FIGS. 2 and 3, the first extending portion 178a is adjacent to the second support portion 112 on the arrow B2 side of the second support portion 112. The first extending portion 178a is separated from the second support portion 112.

In FIG. 8, only one first mounting hole 180a is formed through the first extending portion 178a for mounting the first connecting portion 174a. The first connection portion 174a is fixed to the first mounting hole 180a of the first conductor portion 172*a* in an immovable state. The first connection portion 174*a* includes a first connection portion main body 182*a* and a first fastening member 184*a*.

The first connection portion main body 182*a* is made of, for example, copper, aluminum, stainless steel, titanium, or a metal containing any of these as a main component. The first connection portion main body 182*a* is formed in a cylindrical shape. The first connection portion main body 182*a* has an outer peripheral surface having a substantially circular cross section. The first connection portion main body 182*a* extends in the up-down direction (in the direction indicated by the arrow C) so as to pass through the first through-hole 118 and the first communication hole 162. One end surface of the first connection portion main body 182*a* is in contact with an upper surface of the first extending portion 178*a*. The other end surface of the first connection portion main body 182*a* is in contact with the lower surface of the first terminal portion 145*a*.

In FIG. 7, the outer-diameter D1 of the first connecting portion main body 182*a* is smaller than the lengths L4 and L6 of the first through-hole 118. That is, a clearance is formed between the first connection portion main body 182*a* and the inner surface forming the first through-hole 118 so as to ensure electrical insulation.

As shown in FIG. 8, the first fastening member 184*a* fastens the first conductor portion 172*a* and the first terminal portion 145*a* to each other by screws. Specifically, the first fastening member 184*a* includes a first fixing nut 186*a* and a first bolt portion 188*a*. The first fixing nut 186*a* is fixed to the first extending portion 178*a*. The first bolt portion 188*a* is screwed into the first fixing nut 186*a* to fasten the first terminal portion 145*a* downward.

The first fixing nut 186*a* is fixed to the lower surface of the first extending portion 178*a* by welding or the like, for example. The first bolt portion 188*a* includes a first bolt body 190*a* and a first pressing portion 192*a* provided on the first bolt body 190*a*. The first bolt body 190*a* extends in the up-down direction so as to be inserted through the first mounting hole 180*a* of the first extending portion 178*a*, the inner hole of the first connection portion main body 182*a*, and the first hole 143*a* of the first terminal portion 145*a*.

One end of the first bolt body 190*a* is formed with a male screw portion 196*a* to be screwed into the female screw portion 194*a* of the first fixing nut 186*a*. The other end of the first bolt body 190*a* is formed with a male screw portion 200*a* that is screwed into the female screw portion 198*a* formed in the first pressing portion 192*a*. The outer diameter of the first pressing portion 192*a* is larger than the diameter (hole diameter) of the first hole 143*a* of the first terminal portion 145*a*. That is, the first pressing portion 192*a* abuts on the upper surface of the first terminal portion 145*a*.

The second power lead-out member 170*b* electrically connects the second terminal member 24*b* and the second terminal portion 145*b* of the electrical unit body 144 to each other. The second power lead-out member 170*b* includes a second conductor portion 172*b* and a second connection portion 174*b*.

The second conductor portion 172*b* is a bus bar formed in a band shape. The second conductor portion 172*b* is made of the same material as that of the first conductor portion 172*a* described above. The second conductor portion 172*b* is an L-shaped integrally molded product. The second conductor portion 172*b* includes a second fixing portion 176*b* extending in the vertical direction (the direction of the arrow C) and a second extending portion 178*b* extends in the stacking direction (the direction of the arrow A).

One end portion (lower end portion) of the second fixing portion 176*b* is electrically connected to the second terminal member 24*b* by brazing, swaging, welding, screwing, or the like. The other end (upper end) of the second fixing portion 176*b* is located above the second insulating plate 26*b* (cell stack body 22).

The second extending portion 178*b* extends from the other end of the second fixing portion 176*b* in the arrow A1 direction. The second extending portion 178*b* is located in the space S3 between the first portion 106 of the upper wall portion 94*d* and the cell stack body 22. In other words, the second extending portion 178*b* is spaced apart from both the cell stack body 22 and the first portion 106.

In FIGS. 2 and 3, the second extending portion 178*b* is adjacent to the second support portion 112 in the arrow B2 side of the second supporting portion. The second extending portion 178*b* is separated from the second support portion 112.

In FIG. 8, only one second mounting hole 180*b* is formed through the second extending portion 178*b* for mounting the second connection portion 174*b*. The second connection portion 174*b* is fixed to the second mounting hole 180*b* (mounting portion) of the second conductor portion 172*b* in an immovable state. The second connecting portion 174*b* includes a second connection portion main body 182*b* and a second fastening member 184*b*.

The second connection portion main body 182*b* is formed of the same material as that of the first connection portion main body 182*a* described above. The second connection portion main body 182*b* is formed in a cylindrical shape. The second connection portion main body 182*b* has an outer peripheral surface having a round shape in cross section. The second connection portion main body 182*b* extends in the up-down direction (in the direction indicated by the arrow C) so as to pass through the second through-hole 120 and the second communication hole 164. One end surface of the second connection portion main body 182*b* is in contact with an upper surface of the second extending portion 178*b*. The other end surface of the second connection portion main body 182*b* is in contact with the lower surface of the second terminal portion 145*b*.

In FIG. 7, the outer diameter D2 of the second connecting portion main body 182*b* is the same size as the outer diameter D1 of the first connecting portion main body 182*a*, and is smaller than the lengths L3 and L5 of the second through-hole 120. That is, a clearance is formed between the second connection portion main body 182*b* and the inner surface forming the second through-hole 120 so as to ensure electrical insulation.

As shown in FIG. 8, the second fastening member 184*b* fastens the second conductor portion 172*b* and the second terminal portion 145*b* to each other by screws. Specifically, the second fastening member 184*b* includes a second fixing nut 186*b* and a second bolt portion 188*b*. The second fixing nut 186*b* is fixed to the second extending portion 178*b*. The second bolt portion 188*b* is screwed into the second fixing nut 186*b* to fasten the second terminal portion 145*b* downward.

The second fixing nut 186*b* is fixed to the lower surface of the second extending portion 178*b* by welding or the like, for example. The second bolt portion 188*b* includes a second bolt body 190*b* and a second pressing portion 192*b* provided on the second bolt body 190*b*. The second bolt body 190*b* extends in the up-down direction so as to be inserted through the second mounting hole 180*b* of the second extending portion 178*b*, the inner hole of the second connection portion main body 182b, and the second hole 143b of the second terminal portion 145b.

One end portion of the second bolt body 190b is formed with a male screw portion 196b to be screwed into the female screw portion 194b of the second fixing nut 186b. The other end portion of the second bolt body 190b is formed with a male screw portion 200b that is screwed into a female screw portion 198b formed in the second pressing portion 192b. The outer diameter of the second pressing portion 192b is larger than the diameter (hole diameter) of the second hole 143b of the second terminal portion 145b. That is, the second pressing portion 192b is in contact with the upper surface of the second terminal portion 145b.

The operation of the fuel cell stack 12 configured as described above will be described below.

First, as shown in FIG. 4, the oxygen-containing gas is introduced from the oxygen-containing gas supply passage 46a into the oxygen-containing gas flow field 54 of the first separator member 32. The oxygen-containing gas flows in the direction indicated by the arrow B along the oxygen-containing gas flow field 54 and is supplied to the cathode 42 on the MEA 36.

On the other hand, as shown in FIGS. 4 and 6, the fuel gas is introduced from the fuel gas supply passage 50a into the fuel gas flow field 68 of the second separator 34. The fuel gas moves in the direction of arrow B along the fuel gas flow field 68 and is supplied to the anode 44 of the MEA 36.

Accordingly, in each MEA 36, the oxygen-containing gas supplied to the cathode 42 and the fuel gas supplied to the anode 44 are consumed by electrochemical reactions in the first electrode catalyst layer and the second electrode catalyst layer. As a result, power generation is performed.

Next, as shown in FIG. 4, a remainder of the oxygen-containing gas supplied to and consumed at the cathode 42 is discharged in the direction indicated by the arrow A along the oxygen-containing gas discharge passage 46b. Similarly, a remainder of the fuel gas supplied to and consumed at the anode 44 is discharged in the direction of the arrow A along the fuel gas discharge passage 50b.

The coolant supplied to the coolant supply passage 48a is introduced into the coolant flow field 80 formed between the first separator member 32 and the second separator 34. After being introduced into the coolant flow field 80, the coolant flows in the direction of the arrow B. After cooling the MEA 36, the coolant is discharged from the coolant discharge passage 48b.

Next, a method of producing the fuel cell system 10 according to the present embodiment will be described.

Figure 9:
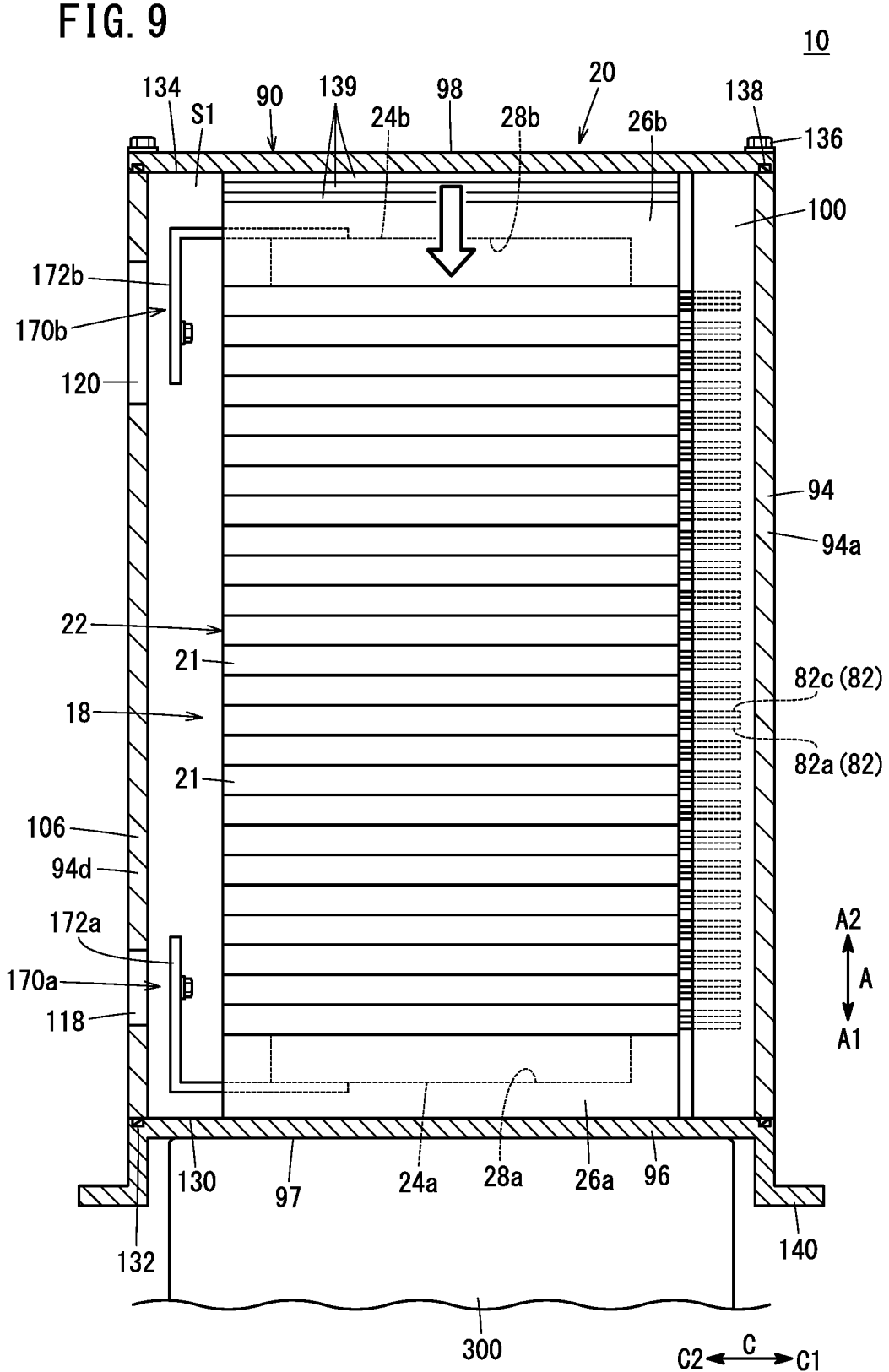
FIG. 9 is an explanatory view of a method of producing the fuel cell system shown in FIG. 1.

As shown in FIG. 9, in the method of producing the fuel cell stack 12, the first end plate 96 (only the first case member 140) is fixed to one end of the peripheral wall case 94. Then, the first case member 140 is set on the support base 300 in a state in which the surface 97 of the first end plate 96 on the side opposite to the peripheral wall case 94 faces vertically downward.

Thereafter, the first insulating plate 26a, the first terminal member 24a, the plurality of power generation cells 21 (cell stack body 22), the second terminal member 24b, the second insulating plate 26b, and the shim 139 are stacked in the peripheral wall case 94 in this order to form the stacked member 18. Then, the second end plate 98 is fastened to the other end of the peripheral wall case 94 by the bolts 136. At this time, the second end plate portion 98 presses the second insulating plate 26b toward the cell stack body 22. Thus, a compressive load is applied to the cell stack body 22.

Subsequently, the fuel cell auxiliary device 14 is fixed to the first case member 140, and the second case member 142 is attached to the first case member 140 so as to cover the fuel cell auxiliary device 14. Thus, the production of the fuel cell stack 12 is completed. Subsequently, the electrical unit 16 is mounted on the upper wall portion 94d of the stack case 90 of the fuel cell stack 12.

Specifically, the case main body 148 of the electrical component case 146 is fixed to the upper wall portion 94d of the stack case 90. At this time, the first communication hole 162 is positioned above the first through-hole 118. The second communication hole 164 is located above the second through-hole 120. Next, the first conductor portion 172a and the first terminal portion 145a are connected to each other by the first connection portion 174a. The second conductor portion 172b and the second terminal portion 145b are connected to each other by the second connection portion 174b. Thereafter, the cover 150 is attached to the case main body 148, thereby completing the production of the fuel cell system 10 of the present embodiment.

In this case, the fuel cell stack 12 according to the present embodiment has the following effects.

In the fuel cell stack 12 produced as described above, the position of the second terminal member 24b in the stacking direction with respect to the first terminal member 24a varies depending on the assembly tolerance of the plurality of power generation cells 21 and the dimensional tolerance of each power generation cell 21. The assembly tolerance of the plurality of power generation cells 21 includes a difference between elastic deformation amounts (elastic deformation amounts of the first seal portion 56 and the second seal portion 70) of the power generation cells 21 in the stacking direction.

Figure 10:
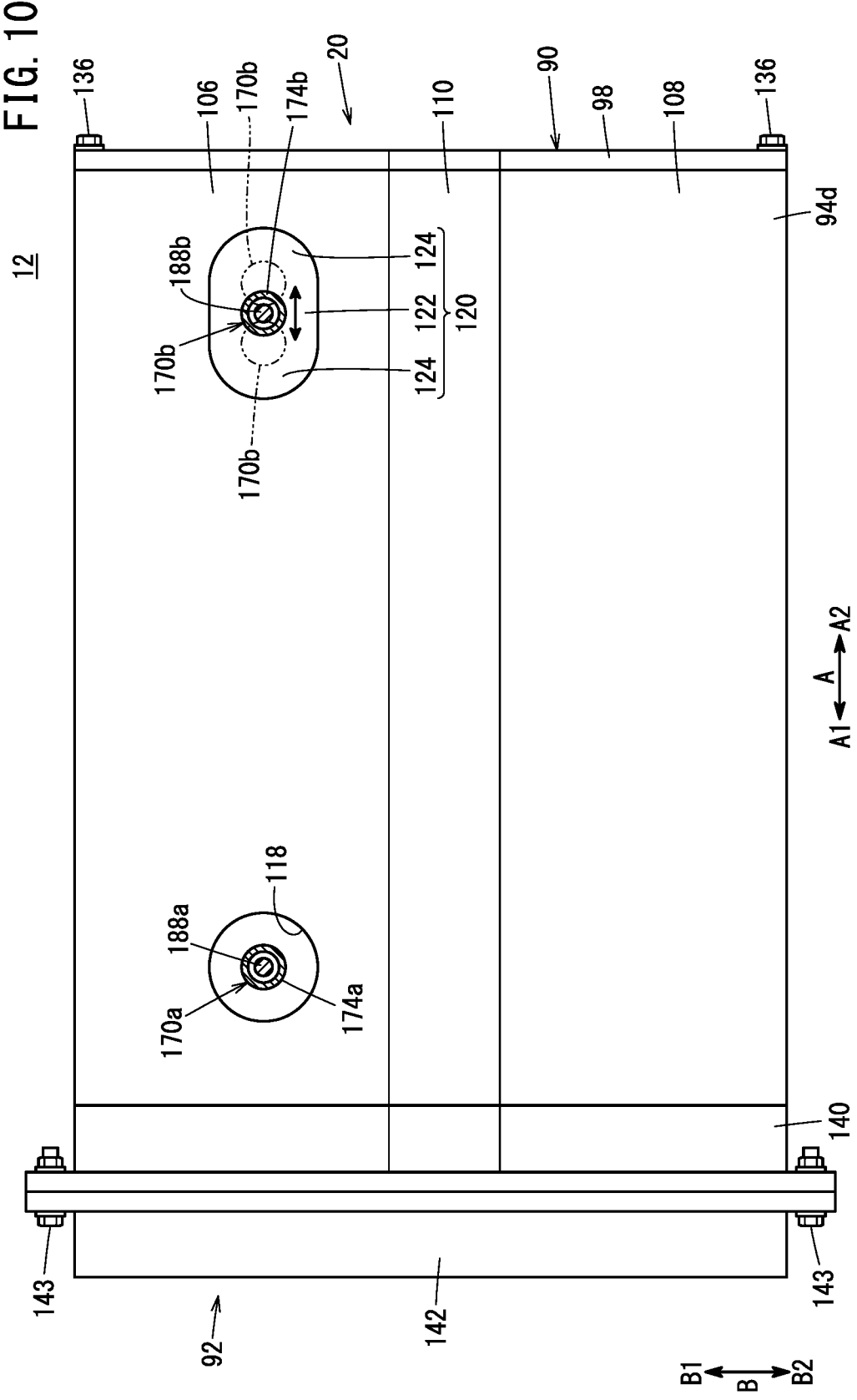
FIG. 10 is an explanatory view of a state in which the center of the second power lead-out member and the center of the second through-hole are out of alignment.

Therefore, as shown in FIGS. 8 and 10, the center of the second mounting hole 180b of the second conductor portion 172b and the center of the second through-hole 120 tend to be misaligned in the stacking direction. That is, the second connection portion main body 182b (the second power lead-out member 170b) and the center of the second through-hole 120 tend to be misaligned in the stacking direction. In other words, the second connecting portion main body 182b tends to be displaced in the arrow A1 direction or the arrow A2 direction with respect to the center P2 of the second through-hole 120.

However, in the present embodiment, the length L3 of the second through-hole 120 in the stacking direction is greater than the length L4 of the first through-hole 118 in the stacking direction. Therefore, the positional deviation in the stacking direction between the second power lead-out member 170b (second connection portion 174b) and the second through-hole 120 can be absorbed by making the second through-hole 120 in an elongated shape. Thus, even when the position of the second terminal member 24b with respect to the first terminal member 24a varies in the stacking direction, the second power lead-out member 170b (second connection portion 174b) can be reliably inserted into the second through-hole 120. Further, since the length L4 of the first through-hole 118 in the stacking direction does not become greater than necessary, it is possible to suppress rigidity of the stack case 90 from decreasing.

The stack case 90 includes a first end portion accommodating the first terminal member 24a and a second end portion accommodating the second terminal member 24b. An auxiliary device case 92 for protecting the fuel cell auxiliary device 14 is provided at the first end portion of the stack case 90.

According to such a configuration, the power generation cells 21 can be stacked with the auxiliary device case 92 using as a base.

The second power lead-out member 170b includes a second conductor portion 172b located inside the stack case 90 and electrically connected to the second terminal member 24b, and a second connection portion 174b electrically connected to the second conductor portion 172b and extending in the vertical direction so as to pass through the second through-hole 120.

According to such a configuration, after the stacked member 18 is disposed in the stack case 90, the second connection portion 174b can be connected to the second conductor portion 172b from the outside of the stack case 90.

The second connection portion 174b has an outer peripheral surface having a round shape in cross section, and both ends of the second through-hole 120 in the stacking direction are curved or arc-shaped when viewed from above.

According to such a configuration, contact (ground fault) between the second connection portion 174b and the inner surface forming the second through-hole 120 can be effectively suppressed.

The second through-hole 120 includes a quadrangular central hollow portion 122 extending in the stacking direction and substantially semicircular end hollow portions 124 provided at both ends of the central hollow portion and connected to the central hollow portion.

According to such a configuration, the second through-hole 120 can be elongated in the stacking direction without extending the second through-hole 120 more than necessary in the arrow B direction orthogonal to the stacking direction.

Each of the plurality of power generation cells 21 is provided with a load receiving portion 82 protruding upward. The upper wall portion 94d includes a first portion 106 located above the load receiving portion 82, a second portion 108 located below the outer surface of the first portion 106, and a connecting portion 110 that connects the first portion 106 and the second portion 108 to each other. A first through-hole 118 and a second through-hole 120 are formed in the first portion 106, and the first power lead-out member 170a (first conductor portion 172a) and the second power lead-out member 170b (second conductor portion 172b) are disposed in a space between the first portion 106 and the cell stack body 22.

According to such a configuration, the space above the second portion 108 can be effectively used.

The electrical unit 16 to which the first power lead-out member 170a and the second power lead-out member 170b are electrically connected is disposed on the outer surface of the second portion 108.

According to such a configuration, a total height dimension of the stack case 90 and the electrical unit 16 can be suppressed to be relatively small. This makes it possible to reduce the size of the fuel cell system 10.

The present invention is not limited to the embodiments described above, and various modifications are possible without departing from the essence and gist of the invention.

The above embodiments can be summarized as follows.

The above-described embodiment discloses the fuel cell system (10) includes the stacked member (18) and the stack case (90) accommodating the stacked member, the stacked member having the cell stack body (22), the first terminal member (24a) and the second terminal member (24b), the cell stack body being formed of the plurality of power generation cells (21) stacked one another, the first terminal member and the second terminal member being disposed at both ends of the cell stack body, further including the first power lead-out member (170a) electrically connected to the first terminal member, and the second power lead-out member (170b) electrically connected to the second terminal member, wherein the stack case includes the upper wall portion (94d) with the first through-hole (118) for inserting the first power lead-out member and the second through-hole (120) for inserting the second power lead-out member, and a length (L3) of the second through-hole is greater than a length (L4) of the first through-hole in a stacking direction of the plurality of power generation cells.

In the above-described fuel cell system, the stack case may include the first end portion accommodating the first terminal member and the second end portion accommodating the second terminal member, and the auxiliary device case (92) for protecting the fuel cell auxiliary device (14) may be provided at the first end portion of the stack case.

In the above-described fuel cell system, the second power lead-out member may include the conductor portion (172b) located in the stack case and electrically connected to the second terminal member, and the connection portion (174b) electrically connected to the conductor portion and extending in the vertical direction so as to pass into the second through-hole.

In the above-described fuel cell system, the connecting portion may have an outer peripheral surface having a round shape in cross section, and both ends of the second through-hole in the stacking direction may be curved or arc-shaped when viewed from above.

In the fuel cell system described above, the second through-hole may include the rectangular central hollow portion (122) extending in the stacking direction and substantially semicircular end hollow portions (124) provided at both ends of the central hollow portion and connected to the central hollow portion.

The center (P1) of the first through-hole and the center (P2) of the second through-hole may be located on a single straight line (La) extending along the stacking direction.

In the fuel-cell system described above, the length (L6) of the first through-hole in the direction orthogonal to the stacking direction may be the same as the length (L5) of the second through-hole in the direction orthogonal to the stacking direction.

In the above-described fuel-cell system, each of the plurality of power generation cells may be provided with the load receiving portion (82) protruding upward, and the upper wall portion may include the first portion (106) located above the load receiving portion, the second portion (108) located below the outer surface of the first portion, and the connecting portion (110) coupling the first portion and the second portion, the first through-hole and the second through-hole may be formed in the first portion, and the first power outlet member and the second power outlet member may be disposed in the space (S3) between the first portion and the cell stack body.

In the above-described fuel cell system, the electrical unit (16) to which the first power lead-out member and the second power lead-out member are electrically connected may be disposed on the outer surface of the second portion.

In the above fuel cell system, the first through-hole may be formed in a perfect circular shape.

What is claimed is:

1. A fuel cell system comprising a stacked member including a cell stack body in which a plurality of power generation cells are stacked on one another, and a first terminal member and a second terminal member provided respectively at both ends of the cell stack body; and a stack case that houses the stacked member, further comprising:
   a first power lead-out member electrically connected to the first terminal member; and a second power lead-out member electrically connected to the second terminal member, wherein an upper wall portion of the stack case includes:

a first through-hole through which the first power lead-out member is inserted; and a second through-hole through which the second power lead-out member is inserted, and a length of the second through-hole in a stacking direction of the plurality of power generation cells is greater than a length of the first through-hole in the stacking direction, each of the plurality of power generation cells is provided with a load receiving portion protruding upward, and the upper wall portion includes:

a first portion located above the load receiving portion; and a second portion located below an outer surface of the first portion; and a connecting portion that connects the first portion and the second portion to each other, wherein the first through-hole and the second through-hole are formed in the first portion, and the first power lead-out member and the second power lead-out member are disposed in a space between the first portion and the cell stack body.

2. The fuel cell system according to claim 1, wherein the stack case includes:

a first end portion configured to accommodate the first terminal member; and a second end portion configured to accommodate the second terminal member, and an auxiliary device case for protecting a fuel cell auxiliary device is provided at the first end portion of the stack case.

3. The fuel cell system according to claim 1, wherein the second power lead-out member includes:

a conductor portion located inside the stack case and electrically connected to the second terminal member; and a connection portion electrically connected to the conductor portion and extending in a vertical direction so as to pass through the second through-hole.

4. The fuel cell system according to claim 3, wherein the connecting portion has an outer peripheral surface having a round shape in cross section, and both ends of the second through-hole in the stacking direction are curved or arc-shaped when viewed from above.

5. The fuel cell system according to claim 4, wherein the second through-hole includes:

a quadrangular central hollow portion extending in the stacking direction; and end hollow portions each having a substantially semicircular shape, the end hollow portions being respectively provided at both ends of the central hollow portion and connected to the central hollow portion.

6. The fuel cell system according to claim 1, wherein a center of the first through-hole and a center of the second through-hole are located on a single straight line extending along the stacking direction.

7. The fuel cell system according to claim 1, wherein a length of the first through-hole in a direction orthogonal to the stacking direction is the same as a length of the second through-hole in the direction orthogonal to the stacking direction.

8. The fuel cell system according to claim 1, wherein an electrical unit to which the first power lead-out member and the second power lead-out member are electrically connected is disposed on an outer surface of the second portion.

9. The fuel cell system according to claim 1, wherein the first through-hole is formed in a perfect circular shape.

10. The fuel cell system according to claim 1, wherein the upper wall portion includes:

a first end located at one end in a stacking direction of the plurality of power generation cells;

a second end located at another end in the stacking direction, and the first through-hole is located between a center of the upper wall portion in the stacking direction and the first end, and the second through-hole is located between the center and the second end of the upper wall portion.

* * * * *